(12) United States Patent  
Kurihara et al.

(10) Patent No.: US 12,049,579 B2  
(45) Date of Patent: Jul. 30, 2024

(54) METHOD OF PRODUCING A ROLL-SHAPED BODY

(71) Applicant: ZEON CORPORATION, Tokyo (JP)

(72) Inventors: Ryuta Kurihara, Tokyo (JP); Teiji Kohara, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 0 days.

(21) Appl. No.: 17/644,850

(22) Filed: Dec. 17, 2021

(65) Prior Publication Data

US 2022/0112407 A1 Apr. 14, 2022

Related U.S. Application Data

(63) Continuation of application No. 16/349,391, filed as application No. PCT/JP2017/041904 on Nov. 21, 2017, now abandoned.

(30) Foreign Application Priority Data

Nov. 22, 2016 (JP) .................................. 2016-226506

(51) Int. Cl.
*C09J 7/00* (2018.01)
*B32B 3/00* (2006.01)
(Continued)

(52) U.S. Cl.
CPC ................. *C09J 7/387* (2018.01); *B32B 3/28* (2013.01); *B32B 7/06* (2013.01); *B32B 27/00* (2013.01);
(Continued)

(58) Field of Classification Search
CPC .......... B32B 2037/268; B32B 2398/20; B32B 27/00; B32B 3/28; B32B 37/203;
(Continued)

(56) References Cited

U.S. PATENT DOCUMENTS 5,425,977 A 6/1995 Hopfe
5,455,103 A 10/1995 Hoagland et al.
(Continued)

FOREIGN PATENT DOCUMENTS

CA 2977454 A1 * 9/2016 ............. B32B 25/08
CN 104428268 A 3/2015
(Continued)

OTHER PUBLICATIONS

English translation of JP2008156423.*
(Continued)

*Primary Examiner* — Linda L Gray
(74) *Attorney, Agent, or Firm* — KENJA IP LAW PC (57) ABSTRACT

A method of producing a roll-shaped body comprises: obtaining an adhesive agent sheet having an embossed shape at both surfaces thereof by imparting an embossed shape on both surfaces of an adhesive agent sheet containing a thermoplastic resin as a main component; overlapping a protective sheet having releasability from the adhesive agent sheet to at least one surface of the adhesive agent sheet having the embossed shape at both surfaces thereof; and obtaining the roll-shaped body by wounding the adhesive agent sheet having the embossed shape at both surfaces thereof and the protective sheet that are overlapped facing one another.

8 Claims, 2 Drawing Sheets

(51) Int. Cl.

| | | |
|---|---|---|
| B32B 3/28 | (2006.01) | |
| B32B 7/00 | (2019.01) | |
| B32B 7/06 | (2019.01) | |
| B32B 27/00 | (2006.01) | |
| B32B 37/00 | (2006.01) | |
| B32B 37/20 | (2006.01) | |
| B32B 38/00 | (2006.01) | |
| B32B 38/06 | (2006.01) | |
| B32B 38/18 | (2006.01) | |
| C09J 7/10 | (2018.01) | |
| C09J 7/38 | (2018.01) | |
| C09J 7/40 | (2018.01) | |
| C09J 153/00 | (2006.01) | |
| C09J 153/02 | (2006.01) | |
| B32B 37/26 | (2006.01) | |

(52) U.S. Cl.
CPC ........... *B32B 37/203* (2013.01); *B32B 38/06* (2013.01); *B32B 38/18* (2013.01); *C09J 7/10* (2018.01); *C09J 7/40* (2018.01); *C09J 7/405* (2018.01); *C09J 153/02* (2013.01); *C09J 153/025* (2013.01); *B32B 2037/268* (2013.01); *B32B 2398/20* (2013.01); *C09J 2423/046* (2013.01); *C09J 2423/105* (2013.01); *C09J 2423/106* (2013.01); *C09J 2453/00* (2013.01); *C09J 2467/006* (2013.01)

(58) Field of Classification Search
CPC . B32B 38/06; B32B 38/18; B32B 7/06; C09J 153/02; C09J 153/025; C09J 2423/046; C09J 2423/105; C09J 2423/106; C09J 2453/00; C09J 2467/006; C09J 7/10; C09J 7/387; C09J 7/40; C09J 7/405; C08F 230/08; C08F 287/00; C08F 297/046

See application file for complete search history.

(56) References Cited

U.S. PATENT DOCUMENTS

| | | |
|---|---|---|
| 7,070,051 B2 | 7/2006 | Kanner et al. |
| 2003/0022015 A1 | 1/2003 | Wong |
| 2004/0260028 A1 | 12/2004 | Sone |
| 2010/0297406 A1 | 11/2010 | Schaffer et al. |
| 2011/0005550 A1 | 1/2011 | Hamilton |
| 2013/0008506 A1 | 1/2013 | Tanahashi et al. |
| 2014/0020759 A1 | 1/2014 | Oda et al. |
| 2015/0104654 A1 | 4/2015 | Kohara et al. |
| 2015/0174862 A1 | 6/2015 | Kitano et al. |
| 2015/0307758 A1 | 10/2015 | Tazaki et al. |
| 2016/0101602 A1 | 4/2016 | Kitano et al. |
| 2016/0129674 A1 | 5/2016 | Kitano et al. |
| 2016/0151995 A1 | 6/2016 | Kitano et al. |
| 2017/0197385 A1 | 7/2017 | Hirota et al. |
| 2018/0030195 A1 | 2/2018 | Oshita et al. |

FOREIGN PATENT DOCUMENTS

| | | | |
|---|---|---|---|
| DE | 2302301 A1 * | 8/1973 | |
| DE | 2302301 A * | 1/2001 | ........... B29C 65/103 |
| EP | 1623822 A1 | 2/2006 | |
| EP | 2623526 A1 | 8/2013 | |
| JP | S4642902 B1 | 12/1971 | |
| JP | H06198809 A | 7/1994 | |
| JP | H08100155 A | 4/1996 | |
| JP | H08142247 A | 6/1996 | |
| JP | H0940444 A | 2/1997 | |
| JP | H09241045 A | 9/1997 | |
| JP | H09295839 A | 11/1997 | |
| JP | H1017338 A | 1/1998 | |
| JP | H10167773 A | 6/1998 | |
| JP | H10231150 A | 9/1998 | |
| JP | H1135347 A | 2/1999 | |
| JP | H11147735 A | 6/1999 | |
| JP | 2000007390 A | 1/2000 | |
| JP | 2000044295 A | 2/2000 | |
| JP | 2000203900 A | 7/2000 | |
| JP | 2000203901 A | 7/2000 | |
| JP | 2000203902 A | 7/2000 | |
| JP | 2000256043 A | 9/2000 | |
| JP | 2000290046 A | 10/2000 | |
| JP | 2000319045 A | 11/2000 | |
| JP | 2001019499 A | 1/2001 | |
| JP | 2001026468 A | 1/2001 | |
| JP | 2001048599 A | 2/2001 | |
| JP | 2001114538 A | 4/2001 | |
| JP | 2001130931 A | 5/2001 | |
| JP | 2001150540 A | 6/2001 | |
| JP | 2001163641 A | 6/2001 | |
| JP | 2001192244 A | 7/2001 | |
| JP | 2001220182 A | 8/2001 | |
| JP | 2001261385 A | 9/2001 | |
| JP | 2002037648 A | 2/2002 | |
| JP | 2002104846 A | 4/2002 | |
| JP | 2003048762 A | 2/2003 | |
| JP | 2003128442 A | 5/2003 | |
| JP | 2003212614 A | 7/2003 | |
| JP | 2003238218 A | 8/2003 | |
| JP | 2004339339 A | 12/2004 | |
| JP | 2008156423 A | 7/2008 | |
| JP | 2013091793 A | 5/2013 | |
| JP | 2015078090 A | 4/2015 | |
| WO | 9519885 A1 | 7/1995 | |
| WO | 0172509 A2 | 10/2001 | |
| WO | 03018656 A1 | 3/2003 | |
| WO | WO-2011024421 A1 * | 3/2011 | ............. B29C 33/38 |
| WO | 2011096389 A1 | 8/2011 | |
| WO | 2012043708 A1 | 4/2012 | |
| WO | 2012133668 A1 | 10/2012 | |
| WO | 2013176258 A1 | 11/2013 | |
| WO | 2014021459 A1 | 2/2014 | |
| WO | 2014091941 A1 | 6/2014 | |
| WO | 2015016358 A1 | 2/2015 | |
| WO | 2015016361 A1 | 2/2015 | |
| WO | 2015016366 A1 | 2/2015 | |
| WO | 2016052609 A1 | 4/2016 | |
| WO | 2016136760 A1 | 9/2016 | |

OTHER PUBLICATIONS

English translation of JP46042902.*
English translation of WO2016136760.*
English translation of JP08142247.*
English translation of WO2018043182.*
Aug. 23, 2021, Office Action issued by the China National Intellectual Property Administration in the corresponding Chinese Patent Application No. 201780065290.X.
Database WPI Week 199625 Thomson Scientific, London, GB; AN 1996-247082, XP002799225, 1996.
Database WPI Week 199632 Thomson Scientific, London, GB; AN 1996-317782, XP002799224, 1996.
Dec. 26, 2017, International Search Report issued in the International Patent Application No. PCT/JP2017/041904.
Hao Ding, Practical Handbook for Plastics Industry (2nd edition), Chemical Industry Press, Aug. 2000, pp. 79-80.
Jun. 22, 2020, the Extended European Search Report issued by the European Patent Office in the corresponding European Patent Application No. 17874154.2.
May 28, 2019, International Preliminary Report on Patentability issued in the International Patent Application No. PCT/JP2017/041904.
Taotao Qiang, Synthetic Leather Chemicals, China Light Industry Press, Jul. 2016, p. 205, 1st edition.
Zengyue Cheng, General Resin Practical Technical Handbook, China Petrochemical Press, Nov. 1999, p. 274, 1st edition.

(56) References Cited

OTHER PUBLICATIONS

Apr. 17, 2023, Communication pursuant to Article 94(3) EPC issued by the European Patent Office in the corresponding European Patent Application No. 17874154.2.

* cited by examiner

METHOD OF PRODUCING A ROLL-SHAPED BODY

CROSS-REFERENCE TO RELATED APPLICATION

The present application is a continuation application of U.S. patent application Ser. No. 16/349,391 filed May 13, 2019, which is a National Stage Application of PCT/JP2017/041904 filed Nov. 21, 2017, which claims priorities based on Japanese Patent Application No. 2016-226506 filed Nov. 22, 2016. The disclosures of the prior applications are hereby incorporated by reference herein in their entirety.

TECHNICAL FIELD

The present disclosure relates to a roll-shaped body including an adhesive agent sheet containing a thermoplastic resin as a main component.

BACKGROUND

Polyvinyl acetal resin sheets are known to be useful as adhesive agent sheets of laminate glass.

PTL 1 and 2 describe, in relation to when a polyvinyl acetal resin sheet is used as an adhesive agent sheet of laminate glass, the use of a sheet having little shrinkage under heating in order to reduce bubbles and non-filling at edges thereof and reduce warping at glass end surfaces. These documents describe the inclusion of an organic acid salt of a metal having a valence of 2 or higher in a polyvinyl acetal resin and performing winding after cooling only the surface of a sheet straight after extrusion with the aim of stabilizing heat shrinkage of the sheet.

These documents also describe performing embossing with respect to the surface of the sheet in order to facilitate degassing in lamination of the sheet with glass. A method in which a melt fracture structure is formed during extrusion and a method in which an embossed shape is imparted by passing an extruded sheet between a metal roll having an embossed shape at the surface thereof and hard rubber are described as examples of methods by which depressions and protrusions can be formed at the surface the sheet.

PTL 3 describes the use of a polyvinyl acetal interlayer film having small transverse direction (TD; direction perpendicular to extrusion direction) expansion and small machine direction (MD; direction parallel to extrusion direction) shrinkage under heating in order to prevent an interlayer film for adhesion protruding from between glass sheets in a preliminary pressure bonding step during laminate glass production. Moreover, this document describes reducing the speed difference between rolls that a resin film extruded from a die of an extruder during sheet shaping passes up until being wound in order to produce an interlayer film having small expansion and shrinkage under heating.

On the other hand, PTL 4 to 6 disclose that a specific modified hydrogenated block copolymer including alkoxysilyl groups can be used in applications for which adhesiveness is required such as solar cell sealing materials, laminate glass interlayer films, and sealing materials for organic electroluminescence elements.

Of these documents, PTL 5 describes the excellent adhesiveness with glass, light resistance, heat resistance, and optical properties of an adhesive agent sheet formed from the specific modified hydrogenated block copolymer including alkoxysilyl groups, and also explains that handling is simple and stable adhesiveness can be obtained without the need for special water content management to control adhesive force with glass, which is essential in the case of a polyvinyl acetal resin sheet. This document also describes a production example for a sheet having an embossed shape at one surface thereof.

However, when an embossed shape has only been imparted at one surface of an adhesive agent sheet formed from the specific modified hydrogenated block copolymer including alkoxysilyl groups, there have been cases in which, during production of light laminate glass or the like using thin sheet glass, alignment has been difficult and workability has been remarkably poor due to poor sliding properties at a location where the thin plate glass and a smooth non-embossed surface of the adhesive agent sheet come into contact or at a location where smooth surfaces of adhesive agent sheets come into contact with one another.

In light of the above, it is preferable that an adhesive agent sheet having an embossed shape at both surfaces thereof is used in production of laminate glass using an adhesive agent sheet formed from the specific modified hydrogenated block copolymer including alkoxysilyl groups.

On the other hand, a roll-shaped body in which the adhesive agent sheet formed from the specific modified hydrogenated block copolymer is wound up has flexibility, and thus there have been cases in which adhesive agent sheet blocking has occurred in such a roll-shaped body when the roll-shaped body has been transported by truck or boat or has been stored in a warehouse for a long time during the summer, and, as a result, it has not been possible to use the roll-shaped body in shaping processing using the adhesive agent sheet. In particular, since a modified hydrogenated block copolymer having a low softening temperature is used in a situation in which sealing is required at a relatively low temperature of approximately 100° C., such as for a sealing material of an organic electroluminescence element, there has been concern that in this situation, adhesive agent sheet blocking may easily occur and deformation of the adhesive agent sheet may also occur in a roll-shaped body in which the adhesive agent sheet is simply wound up.

For this reason, a roll-shaped body in which blocking of an adhesive agent sheet does not occur even upon temporary exposure to a high-temperature condition during transport or storage is essential.

CITATION LIST

Patent Literature

PTL 1: WO 2012/133668 A1
PTL 2: JP 2013-91793 A
PTL 3: WO 2016/052609 A1
PTL 4: WO 2012/043708 A1
PTL 5: WO 2013/176258 A1
PTL 6: WO 2014/091941 A1

SUMMARY

Technical Problem

The present disclosure is made in light of the situation set forth above and an objective thereof is to provide a roll-shaped body that includes an adhesive agent sheet excelling in terms of low hygroscopicity, light resistance, transparency, and flexibility and that can prevent blocking of the adhesive agent sheet even upon temporary exposure to a high-temperature condition during transport or storage.

Solution to Problem

The inventors conducted extensive and diligent studies in relation to methods for preventing blocking of a roll-shaped body including an adhesive agent sheet having an embossed shape at both surfaces thereof and containing a thermoplastic resin such as a specific modified hydrogenated block copolymer as a main component with the aim of achieving the objective set forth above.

As a result, the inventors discovered that a roll-shaped body in which at least one surface of an adhesive agent sheet having an embossed shape imparted at both surfaces thereof and a protective sheet having releasability from the adhesive agent sheet are overlapped facing one another and are wound up can prevent blocking of the adhesive agent sheet even upon temporary exposure to a high-temperature condition during transport or storage. In this manner, the inventors completed the present disclosure.

Accordingly, the present disclosure provides the following adhesive agent sheet-containing roll-shaped bodies (1) to (5).

(1) A roll-shaped body comprising an adhesive agent sheet containing a thermoplastic resin as a main component and having an embossed shape at both surfaces thereof, wherein at least one surface of the adhesive agent sheet and a protective sheet having releasability from the adhesive agent sheet are overlapped facing one another and are wound up.

(2) The roll-shaped body according to the foregoing (1), wherein the thermoplastic resin is a modified hydrogenated block copolymer [E] obtained through introduction of either or both of an alkoxysilyl group and an acid anhydride group into a hydrogenated block copolymer [D] obtained through hydrogenation of a block copolymer [C] including at least two polymer blocks [A] having a repeating unit derived from an aromatic vinyl compound as a main repeating unit and at least one polymer block [B] having a repeating unit derived from a chain conjugated diene compound as a main repeating unit.

(3) The roll-shaped body according to the foregoing (1) or (2), wherein the thermoplastic resin is a modified hydrogenated block copolymer [E] obtained through introduction of either or both of an alkoxysilyl group and an acid anhydride group into a hydrogenated block copolymer [D] obtained through hydrogenation of 90% or more of main chain and side chain carbon-carbon unsaturated bonds and aromatic ring carbon-carbon unsaturated bonds in a block copolymer [C] including at least two polymer blocks [A] having a repeating unit derived from an aromatic vinyl compound as a main repeating unit and at least one polymer block [B] having a repeating unit derived from a chain conjugated diene compound as a main repeating unit.

(4) The roll-shaped body according to any one of the foregoing (1) to (3), wherein the adhesive agent sheet further contains at least 1 part by mass and not more than 40 parts by mass of a tackifier per 100 parts by mass of the thermoplastic resin.

(5) The roll-shaped body according to any one of the foregoing (1) to (4), wherein the protective sheet is formed from a resin having at least one of polyethylene, polypropylene, and polyethylene terephthalate as a main component.

Advantageous Effect

A presently disclosed roll-shaped body including an adhesive agent sheet can prevent blocking of the adhesive agent sheet even upon temporary exposure to a high-temperature condition of approximately 60° C. during transport or storage.

DETAILED DESCRIPTION

[Roll-Shaped Body]

A presently disclosed adhesive agent sheet-containing roll-shaped body is a roll-shaped body in which an adhesive agent sheet containing a thermoplastic resin as a main component and having an embossed shape at both surfaces thereof and a protective sheet having releasability from the adhesive agent sheet are overlapped facing one another and are wound up.

(Thermoplastic Resin)

Any thermoplastic resin that is commonly known in the art as an adhesive agent may be used as the thermoplastic resin that is a main component of the adhesive agent sheet used in the presently disclosed roll-shaped body. One of such thermoplastic resins may be used individually, or two or more of such thermoplastic resins may be used in combination.

The term "main component" as used in the present disclosure refers to a component that constitutes 50 mass % or more, preferably 65 mass % or more, more preferably 70 mass % or more, and particularly preferably 75 mass % or more of the whole.

Examples of thermoplastic resins that may be used include a modified hydrogenated block copolymer including alkoxysilyl groups, acid anhydride groups, or the like; a polyvinyl acetal resin; a polyvinyl butyral resin; an ethylene-vinyl acetate copolymer resin; an ethylene-acrylic acid copolymer resin or metal salt thereof; a polyurethane resin; and a polyvinyl alcohol resin.

Of these thermoplastic resins, a modified hydrogenated block copolymer including alkoxysilyl groups and a modified hydrogenated block copolymer including acid anhydride groups are preferable due to having excellent transparency and low-temperature impact resistance.

[Modified Hydrogenated Block Copolymer]

The modified hydrogenated block copolymer that may be used in the presently disclosed roll-shaped body (hereinafter, also referred to as "modified hydrogenated block copolymer [E]") is a modified hydrogenated block copolymer [E] obtained through introduction of either or both of an alkoxysilyl group and an acid anhydride group into a hydrogenated block copolymer [D] obtained through hydrogenation (preferably with hydrogenation of 90% or more of main chain and side chain carbon-carbon unsaturated bonds and aromatic ring carbon-carbon unsaturated bonds) of a block copolymer [C] including at least two polymer blocks [A] having a repeating unit derived from an aromatic vinyl compound as a main repeating unit and at least one polymer block [B] having a repeating unit derived from a chain conjugated diene compound as a main repeating unit.

[Hydrogenated Block Copolymer [D]]

Structural units constituting each block of the hydrogenated block copolymer [D] may be composed solely of structural units with saturated bonding, or may have the unsaturated bond-containing block copolymer [C] as a precursor and be obtained through hydrogenation of at least some, and preferably 90 mass % or more, of all unsaturated bonds in the block copolymer [C].

[Block Copolymer [C]]

The block copolymer [C] is a block copolymer including at least two polymer blocks having a structural unit derived from an aromatic vinyl compound as a main repeating unit (hereinafter, also referred to as "polymer blocks [A]") and at least one polymer block having a structural unit derived from a chain conjugated diene compound as a main repeating unit (hereinafter, also referred to as "polymer block [B]").

The polymer blocks [A] are polymer blocks having a structural unit derived from an aromatic vinyl compound (hereinafter, also referred to as "structural unit (a)") as a main repeating unit. The content of structural unit (a) in the polymer blocks [A] is normally 90 mass % or more, preferably 95 mass % or more, and more preferably 99 mass % or more. If the content of structural unit (a) in the polymer blocks [A] is too low, heat resistance of the hydrogenated block copolymer [D] and the modified hydrogenated block copolymer [E] used herein may decrease.

The polymer blocks [A] may include components other than structural unit (a). Examples of such other components include a structural unit derived from a chain conjugated diene (hereinafter, also referred to as "structural unit (b)") and/or a structural unit derived from another vinyl compound (hereinafter, also referred to as "structural unit (v)"). The content of structural unit (b) and/or structural unit (v) in the polymer blocks [A] is normally 10 mass % or less, preferably 5 mass % or less, and more preferably 1 mass % or less. If the content of structural unit (b) and/or structural unit (v) in the polymer blocks [A] is too high, heat resistance of the hydrogenated block copolymer [D] and the modified hydrogenated block copolymer [E] used herein may decrease. The polymer blocks [A] included in the block copolymer [C] may be the same as one another or different so long as they satisfy any of the ranges set forth above.

The polymer block [B] is a polymer block having structural unit (b) as a main repeating unit. The content of structural unit (b) in the polymer block [B] is normally 70 mass % or more, preferably 80 mass % or more, and more preferably 90 mass % or more. When the content of structural unit (b) in the polymer block [B] is within any of the ranges set forth above, the hydrogenated block copolymer [D] and the modified hydrogenated block copolymer [E] used herein display flexibility.

The polymer block [B] may include components other than structural unit (b). Examples of such other components include structural unit (a) and/or structure (v). The content of structural unit (a) and/or structure (v) in the polymer block [B] is normally 30 mass % or less, preferably 20 mass % or less, and more preferably 10 mass % or less. If the content of structural unit (a) and/or structural unit (v) in the polymer block [B] is too high, this may cause loss of flexibility of the hydrogenated block copolymer [D] and the modified hydrogenated block copolymer [E] used herein.

In a case in which the block copolymer [C] includes two or more polymer blocks [B], the polymer blocks [B] may be the same as one another or different.

Examples of aromatic vinyl compounds include styrene; styrenes including an alkyl group having a carbon number of 1 to 6 as a substituent such as α-methylstyrene, 2-methylstyrene, 3-methylstyrene, 4-methylstyrene, 2,4-diisopropylstyrene, 2,4-dimethylstyrene, 4-t-butyl styrene, and 5-t-butyl-2-methylstyrene; styrenes including an alkoxy group having a carbon number of 1 to 6 as a substituent such as 4-methoxystyrene; styrenes including an aryl group as a substituent such as 4-phenylstyrene; and vinylnaphthalenes such as 1-vinylnaphthalene and 2-vinylnaphthalene. Of these aromatic vinyl compounds, styrene is preferable from a viewpoint of hygroscopicity and due to the ease of industrial acquisition thereof.

Examples of chain conjugated diene compounds include 1,3-butadiene, isoprene, 2,3-dimethyl-1,3-butadiene, and 1,3-pentadiene. Of these chain conjugated diene compounds, chain conjugated diene compounds that do not include a polar group are preferable from a viewpoint of hygroscopicity, and 1,3-butadiene and isoprene are particularly preferable due to the ease of industrial acquisition thereof.

Examples of other vinyl compounds include chain vinyl compounds, cyclic vinyl compounds, unsaturated cyclic acid anhydrides, and unsaturated imide compounds. These compounds may include substituents such as a nitrile group, an alkoxycarbonyl group, a hydroxycarbonyl group, and a halogen atom. Of these compounds, chain olefins having a carbon number of 2 to 20 such as ethylene, propylene, 1-butene, 1-pentene, 1-hexene, 1-heptene, 1-octene, 1-nonene, 1-decene, 1-dodecene, 1-eicosene, 4-methyl-1-pentene, and 4,6-dimethyl-1-heptene; cyclic olefins such as vinylcyclohexane and norbornene; cyclic diene compounds such as 1,3-cyclohexadiene and norbornadiene; and other compounds that do not include a polar group are preferable from a viewpoint of hygroscopicity.

The block copolymer [C] includes at least two polymer blocks [A] and at least one polymer block [B]. The number of polymer blocks [A] in the block copolymer [C] is normally three or fewer, and preferably two, whereas the number of polymer blocks [B] in the block copolymer [C] is normally two or fewer, and preferably one.

When a larger number of polymer blocks [A] and polymer blocks [B] are included in the block copolymer [C], phase separation of hydrogenated polymer blocks derived from the polymer blocks [A] (hereinafter, also referred to as "hydrogenated polymer blocks (Ah)") and hydrogenated polymer blocks derived from the polymer blocks [B] (hereinafter, also referred to as "hydrogenated polymer blocks (Bh)") in the hydrogenated block copolymer [D] obtained through hydrogenation of the block copolymer [C] may become unclear, a higher glass transition temperature (hereinafter, also referred to as "$Tg_2$") based on the hydrogenated polymer blocks (Ah) may decrease, and heat resistance of the hydrogenated block copolymer [D] and the modified hydrogenated block copolymer [E] used herein may decrease.

The block copolymer [C] can have any block form and may have chain-type blocks or radial-type blocks without any specific limitations. However, chain-type blocks are preferable due to excellent mechanical strength. The most preferable forms of the block copolymer [C] are a triblock copolymer [A]-[B]-[A] in which polymer blocks [A] are bonded to both ends of a polymer block [B] and a pentablock copolymer [A]-[B]-[A]-[B]-[A] in which polymer blocks [B] are bonded to both ends of a polymer block [A] and then polymer blocks [A] are further bonded to the other ends of both of these polymer blocks [B].

The polymer blocks [A] of the block copolymer [C] may be the same as one another or different. Moreover, in a case in which the block copolymer [C] includes two or more polymer blocks [B], the polymer blocks [B] may be the same as one another or different.

When the weight fraction constituted by the total amount of polymer blocks [A] in the block copolymer [C] is taken to be wA and the weight fraction constituted by the total amount of polymer blocks [B] in the block copolymer [C] is taken to be wB, a ratio wA:wB of wA and wB is 25:75 to 65:35, preferably 35:65 to 60:40, and more preferably 40:60 to 55:45. Although heat resistance of the hydrogenated block copolymer [D] and the modified hydrogenated block copolymer [E] used herein increases if wA is too high, flexibility thereof may decrease. On the other hand, heat resistance of the hydrogenated block copolymer [D] and the modified hydrogenated block copolymer [E] used herein may decrease if wA is too low.

Moreover, when the weight fraction of aromatic vinyl compound-derived structural units in the block copolymer [C] is taken to be wa and the weight fraction of chain conjugated diene-derived structural units in the block copolymer [C] is taken to be wb, a ratio wa:wb of wa and wb is 25:75 to 65:35, preferably 35:65 to 60:40, and more preferably 40:60 to 55:45. Although heat resistance of the hydrogenated block copolymer [D] and the modified hydrogenated block copolymer [E] used herein increases if wa is too high, flexibility thereof may decrease. On the other hand, heat resistance of the hydrogenated block copolymer [D] and the modified hydrogenated block copolymer [E] used herein may decrease if wa is too low.

The molecular weight of the block copolymer [C] in terms of polystyrene-equivalent weight-average molecular weight (Mw) measured by gel permeation chromatography (GPC) with tetrahydrofuran (THF) as a solvent is normally 35,000 or more, preferably 38,000 or more, and more preferably 40,000 or more, and is normally 200,000 or less, preferably 150,000 or less, and more preferably 100,000 or less. The molecular weight distribution (Mw/Mn) of the block copolymer [C] is preferably 3 or less, more preferably 2 or less, and particularly preferably 1.5 or less. When Mw and Mw/Mn are within any of the ranges set forth above, the hydrogenated block copolymer [D] and the modified hydrogenated block copolymer [E] used herein have better heat resistance and mechanical strength.

The method by which the block copolymer [C] is produced may be a commonly known method without any specific limitations. For example, the block copolymer [C] may be produced according to a method such as described in WO 2003/018656 A1 or WO 2011/096389 A1.

[Hydrogenated Block Copolymer [D]]

The hydrogenated block copolymer [D] is obtained through hydrogenation of at least some of the main chain and side chain carbon-carbon unsaturated bonds and aromatic ring carbon-carbon unsaturated bonds in the block copolymer [C]. The percentage hydrogenation is preferably 90% or more, more preferably 97% or more, and even more preferably 99% or more. Moreover, the percentage hydrogenation of main chain and side chain carbon-carbon unsaturated bonds in the block copolymer [C] is preferably 97% or more, and more preferably 99% or more. Furthermore, the percentage hydrogenation of aromatic ring carbon-carbon unsaturated bonds in the block copolymer [C] is preferably 97% or more, and more preferably 99% or more. A higher percentage hydrogenation results in the hydrogenated block copolymer [D] and the modified hydrogenated block copolymer [E] used herein having better light resistance and heat degradation resistance. The percentage hydrogenation of the hydrogenated block copolymer [D] can be determined through $^1$H-NMR measurement of the hydrogenated block copolymer [D].

No specific limitations are placed on the method of hydrogenation of unsaturated bonds in the block copolymer [C], the form of reaction, and so forth, and hydrogenation may be carried out in accordance with any commonly known method. Examples of methods by which main chain and side chain carbon-carbon unsaturated bonds derived from a chain conjugated diene compound in the block copolymer [C] can be selectively hydrogenated include methods such as described in JP 2015-78090 A, for example. Moreover, examples of methods by which main chain and side chain carbon-carbon unsaturated bonds in the block copolymer [C] that are derived from a chain conjugated diene compound and aromatic ring carbon-carbon unsaturated bonds in the block copolymer [C] that are derived from an aromatic vinyl compound can be hydrogenated include methods such as described in WO 2011/096389 A1 and WO 2012/043708 A1, for example.

The molecular weight of the hydrogenated block copolymer [D] in terms of polystyrene-equivalent weight-average molecular weight (Mw) measured by GPC with THF as a solvent is normally 35,000 or more, preferably 38,000 or more, and more preferably 40,000 or more, and is normally 200,000 or less, preferably 150,000 or less, and more preferably 100,000 or less. The molecular weight distribution (Mw/Mn) of the hydrogenated block copolymer [D] is preferably 3 or less, more preferably 2 or less, and particularly preferably 1.5 or less. When Mw and Mw/Mn are within any of the ranges set forth above, the hydrogenated block copolymer [D] and the modified hydrogenated block copolymer [E] used herein have better heat resistance and mechanical strength.

After completion of the hydrogenation reaction, the hydrogenated block copolymer [D] can be recovered by removing a hydrogenation catalyst or a hydrogenation catalyst and a polymerization catalyst from the reaction solution, and subsequently removing solvent from the resultant solution. The recovered hydrogenated block copolymer [D] can normally be used in the form of pellets in subsequent shaping processing.

[Modified Hydrogenated Block Copolymer [E]]

The hydrogenated block copolymer [E] used herein is a polymer obtained through introduction of functional groups such as alkoxysilyl groups or acid anhydride groups into the hydrogenated block copolymer [D].

No specific limitations are placed on the method by which functional groups such as alkoxysilyl groups or acid anhydride groups are introduced into the hydrogenated block copolymer [D]. For example, functional groups such as alkoxysilyl groups or acid anhydride groups can be introduced by carrying out a grafting reaction of an ethylenically unsaturated silane compound or an unsaturated carboxylic acid anhydride with the hydrogenated block copolymer [D] in the presence of an organic peroxide. By introducing these functional groups into the hydrogenated block copolymer [D], it is possible to impart adhesiveness with respect to an inorganic substrate such as glass, ceramic, or metal, or an organic substrate such as a thermoplastic resin or thermosetting resin.

No specific limitations are placed on the ethylenically unsaturated silane compound, unsaturated carboxylic acid anhydride, or the like that is used in the grafting reaction so long as it can introduce an alkoxysilyl group, an acid anhydride group, or the like into the hydrogenated block copolymer [D] through a grafting reaction with the hydrogenated block copolymer [D].

Examples of ethylenically unsaturated silane compounds that may be used include vinyltrialkoxysilanes such as vinyltrimethoxysilane and vinyltriethoxysilane; allyltrialkoxysilanes such as allyltrimethoxysilane and allyltriethoxysilane; dialkoxyalkylvinylsilanes such as dimethoxymethylvinylsilane and diethoxymethylvinylsilane; styryltrialkoxysilanes such as p-styryltrimethoxysilane and p-styryltriethoxysilane; ((meth)acryloxyalkyl)trialkoxysilanes such as 3-acryloxypropyltrimethoxysilane, 3-acryloxypropyltriethoxysilane, 3-acryloxypropyltrimethoxysilane, 3-methacryloxypropyltrimethoxysilane, and 3-methacryloxypropyltriethoxysilane; and ((meth)acryloxyalkyl)alkyldialkoxysilanes such as 3-methacryloxypropylmethyldimethoxysilane and 3-methacryloxypropylmethyldiethoxysilane. These ethylenically unsaturated silane compounds may be used individually or as a combination of two or more types.

Examples of unsaturated carboxylic acid anhydrides that may be used include maleic anhydride, citraconic anhydride, itaconic anhydride, 2,3-dimethylmaleic anhydride, 5-norbornene-2,3-dicarboxylic anhydride, allylsuccinic anhydride, 2-phenylmaleic anhydride, and cis-aconitic anhydride. Of these unsaturated carboxylic acid anhydrides, maleic anhydride, itaconic anhydride, and 5-norbornene-2,3-dicarboxylic anhydride can suitably be used from a viewpoint of ease of industrial acquisition. These unsaturated carboxylic acid anhydrides may be used individually or as a combination of two or more types.

Methods commonly known in the art can be used without any specific limitations to carry out the grafting reaction of the ethylenically unsaturated silane compound or the unsaturated carboxylic acid anhydride with the hydrogenated block copolymer [D]. For example, a method in which the grafting reaction of the ethylenically unsaturated silane compound or the unsaturated carboxylic acid anhydride with the hydrogenated block copolymer [D] is carried out in the presence of a peroxide may be adopted.

More specifically, a mixture containing the hydrogenated block copolymer [D], the ethylenically unsaturated silane compound or the unsaturated carboxylic acid anhydride, and a peroxide may be kneaded in a molten state for a certain time using a twin-screw kneader so as to introduce alkoxysilyl groups or acid anhydride groups into the hydrogenated block copolymer [D].

The kneading temperature of the twin-screw kneader is normally 180° C. to 220° C., preferably 185° C. to 210° C., and more preferably 190° C. to 200° C. Moreover, the heated kneading time is normally 0.1 minutes to 10 minutes, preferably 0.2 minutes to 5 minutes, and more preferably 0.3 minutes to 2 minutes. Kneading and extrusion may be performed continuously in a manner such that the heated kneading temperature and heated kneading time (residence time) are within any of the ranges set forth above.

Although no specific limitations are placed on the organic peroxide used in the grafting reaction, it is preferable to use an organic peroxide having a one-minute half-life temperature of 170° C. to 190° C. Examples of such organic peroxides include t-butyl cumyl peroxide, dicumyl peroxide, di-t-hexyl peroxide, 2,5-dimethyl-2,5-di(t-butylperoxy)hexane, di-t-butyl peroxide, and di(2-t-butylperoxyisopropyl)benzene. These organic peroxides may be used individually or as a combination of two or more types.

The quantity in which functional groups such as alkoxysilyl groups or acid anhydride groups are introduced into the hydrogenated block copolymer [D] is normally 0.1 parts by mass or more, preferably 0.5 parts by mass or more, and more preferably 1 part by mass or more per 100 parts by mass of the hydrogenated block copolymer [D], and is normally 10 parts by mass or less, preferably 5 parts by mass or less, and more preferably 3 parts by mass or less per 100 parts by mass of the hydrogenated block copolymer [D]. When the quantity in which alkoxysilyl groups, acid anhydride groups, or the like are introduced is within any of the ranges set forth above, the hydrogenated block copolymer into which these groups have been introduced is provided with adhesiveness with respect to an inorganic substrate such as glass, ceramic, or metal, or an organic substrate such as a thermoplastic resin or thermosetting resin.

(Adhesive Agent Sheet)

The adhesive agent forming the adhesive agent sheet used in the presently disclosed roll-shaped body has a thermoplastic resin as a main component and has excellent adhesiveness with inorganic materials such as glass and metal.

The content ratio of the thermoplastic resin in the adhesive agent is normally 50 mass % or more, preferably 65 mass % or more, more preferably 70 mass % or more, and particularly preferably 75 mass % or more. Through inclusion of 50 mass % or more of the thermoplastic resin in the adhesive agent, the resultant adhesive agent sheet has better mechanical strength and heat resistance, and also has better adhesiveness with inorganic materials such as glass and metal.

In addition to the thermoplastic resin that is the main component of the adhesive agent, various additives that are typically compounded in resins may be compounded in the adhesive agent. Examples of additives that may be used include a tackifier for adjusting adhesion temperature, adhesiveness with glass and metal, and so forth, an antiblocking agent for enhancing processing characteristics, an ultraviolet absorber for blocking ultraviolet rays, and an antioxidant or light stabilizer for improving durability.

A tackifier can be compounded with the thermoplastic resin so as to adjust the adhesion temperature and tackiness of the adhesive agent to within preferable ranges. The tackifier is preferably a tackifier that can be uniformly dissolved or dispersed in the thermoplastic resin, and is more preferably a hydrocarbon polymer having a number-average molecular weight of at least 300 and not more than 5,000.

Specific examples of hydrocarbon polymers that may be used include low-molecular weight polyisobutylene, poly-1-butene, poly-4-methylpentene, poly-1-octene, ethylene-α-olefin copolymer, and the like, and hydrogenated products thereof; and low-molecular weight polyisoprene, polyisoprene-butadiene copolymer, and the like, and hydrogenated products thereof.

One of these tackifiers may be used individually, or two or more of these tackifiers may be used in combination.

Of these tackifiers, a hydrogenated product of low-molecular weight polyisobutylene or a hydrogenated product of low-molecular weight polyisoprene is preferable in terms of maintaining transparency and light resistance, in particular, while also having an excellent tackifying effect.

In a case in which the adhesive agent contains a tackifier, the content of the tackifier per 100 parts by mass of the thermoplastic resin is normally not more than 45 parts by mass and not less than 1 part by mass, preferably not more than 30 parts by mass and not less than 1 part by mass, more preferably not more than 25 parts by mass and not less than 1 part by mass, particularly preferably not more than 20 parts by mass and not less than 5 parts by mass, and most preferably not more than 15 parts by mass and not less than 5 parts by mass. If the content of the tackifier is too high, the resultant adhesive agent sheet may have poorer heat resistance and blocking thereof may occur more easily.

Examples of ultraviolet absorbers that may be used include, but are not specifically limited to, ultraviolet absorbers commonly known in the art such as oxybenzophenone compounds, benzotriazole compounds, salicylic acid ester compounds, benzophenone compounds, and triazine compounds.

Examples of antioxidants that may be used include phosphoric antioxidants, phenolic antioxidants, and sulfuric antioxidants. Examples of light stabilizers that may be used include hindered amine light stabilizers.

One ultraviolet absorber, antioxidant, antiblocking agent, light stabilizer, or the like may be used individually, or two or more ultraviolet absorbers, antioxidants, antiblocking agents, light stabilizers, or the like may be used in combination. The amount of these additives per 100 parts by mass of the hydrogenated block copolymer [D] is normally 5 parts by mass or less, preferably 3 parts by mass or less, and more preferably 1.5 parts by mass or less.

No specific limitations are placed on the method by which additives are compounded with the thermoplastic resin, and any commonly known method that is typically used in production of a resin composition may be adopted. For example, an adhesive agent containing a thermoplastic resin as a main component with which additives are compounded can be produced by uniformly mixing pellets of the thermoplastic resin and the additives, subsequently melt-kneading the mixture using a continuous melt-kneader such as a twin-screw extruder, and then performing extrusion and pelletization.

Alternatively, the additives may be uniformly mixed with thermoplastic resin pellets used in a production method according to the present disclosure, and then the resultant mixture may be used in an adhesive agent sheet production step described further below.

The adhesive agent sheet can be produced by using a resin composition obtained by compounding the thermoplastic resin and various additives as desired in a commonly known method such as melt casting or solution casting.

The adhesive agent sheet has an embossed shape at both surfaces thereof. In a case in which the adhesive agent sheet having an embossed shape at both surfaces thereof is used in production of a laminate, such as in production of laminate glass including glass sheets at both surfaces of the adhesive agent sheet, even if the adhesive agent sheet surface comes into contact with a smooth glass surface or if adhesive agent sheets come into contact with one another, sticking does not occur at the contact surface with the other material. Therefore, the adhesive agent sheet has excellent handleability and workability.

No specific limitations are placed on the shape of embossing formed at the surfaces of the adhesive agent sheet in terms of depth, height, pitch, regularity, line shape, point shape, or the like, and any shape may be adopted to the extent that the effect described above is not lost.

The thickness of the adhesive agent sheet is normally 10 µm or more, preferably 20 µm or more, and more preferably 25 µm or more, and is normally 1,000 µm or less, preferably 900 µm or less, and more preferably 800 µm or less.

If the adhesive agent sheet is too thin, problems such as formation of creases in the adhesive agent sheet and difficulty peeling the adhesive agent sheet from a conveying roll may occur in a production process of the roll-shaped body. If the adhesive agent sheet is too thick, it becomes difficult to wind the adhesive agent sheet into a rolled form due to rigidity of the adhesive agent sheet being too high, and it also becomes difficult to cut the adhesive agent sheet, which may hinder production of the adhesive agent sheet. Moreover, it may become difficult to produce a laminate through adhesion of a glass sheet having a curved shape.

(Protective Sheet Having Releasability)

The protective sheet having releasability that is one element of the presently disclosed roll-shaped body is preferably a sheet formed from a resin having a different component to the adhesive agent sheet as a main component.

The main component of the protective sheet having releasability may be a resin having poor adhesiveness with the adhesive agent sheet, examples of which include olefinic resins (polyethylene, polypropylene, and poly-4-methylpentene), polyester resins (polyethylene phthalate and polybutylene terephthalate), and the like. Other examples of the protective sheet having releasability include protective sheets subjected to release treatment by surface coating with a fluororesin, silicone resin, or the like, and paper.

Of these examples, it is preferable to use a protective sheet having an olefinic resin or a polyester resin as a main component due to the ease of industrial acquisition thereof and the lack of components that migrate to the adhesive agent sheet.

Although no specific limitations are placed on the thickness of the protective sheet so long as it can be wound up as a roll-shaped body, the thickness is normally 5 µm or more, preferably 8 µm or more, and more preferably 10 µm or more, and is normally 200 µm or less, preferably 100 µm or less, and more preferably 50 µm or less.

If the protective sheet is too thick, this increases the weight and external diameter of the roll-shaped body, and may, therefore, be disadvantageous for storage and transport. If the protective sheet is too thin, creases may form in the protective sheet when the protective sheet is overlapped facing the adhesive agent sheet and is then wound up with the adhesive agent sheet.

No specific limitations are placed on the surface shape of the protective sheet. The protective sheet may have an embossed shape at one or more surfaces thereof, or may not have an embossed shape at the surfaces thereof.

The width of the protective sheet is preferably at least the width of the adhesive agent sheet. If the width of the protective sheet is smaller than the width of the adhesive agent sheet, adhesive agent sheet on adhesive agent sheet contact may occur in the roll-shaped body.

The protective sheet can easily be overlapped with the adhesive agent sheet in a continuous manner by using a feeding machine to feed the protective sheet from a protective sheet roll in which the protective sheet is wound up.

It is preferable that foreign matter such as rubbish is not present on the surface of the protective sheet prior to overlapping with the adhesive agent sheet. If foreign matter such as rubbish is present on the protective sheet surface, the adhesive agent sheet may be deformed by the foreign matter when the protective sheet is overlapped with the adhesive agent sheet and then wound up therewith to obtain the roll-shaped body. Moreover, the foreign matter may move onto the surface of the adhesive agent sheet when it is taken from the roll-shaped body and the protective sheet is removed.

Examples of methods by which foreign matter may be removed from the surface of the protective sheet include methods in which, during feeding of the protective sheet from the protective sheet roll, foreign matter is removed using a cleaning roll or foreign matter is blown off through blowing of a gas such as air.

In order to prevent the protective sheet from becoming charged and environmental foreign matter becoming attached thereto during feeding of the protective sheet from the protective sheet roll, an antistatic machine may, for example, be used to reduce attachment of environmental foreign matter to the fed protective sheet.

[Roll-Shaped Body]

The presently disclosed roll-shaped body is a roll-shaped body in which the adhesive agent sheet containing a thermoplastic resin as a main component and having an embossed shape at both surfaces thereof and the protective sheet having releasability are overlapped facing one another and are wound up.

The presently disclosed roll-shaped body has a tubular shape and normally has a hollow column core at the center thereof.

The core of the presently disclosed roll-shaped body is preferably a columnar member having a hollow shape in consideration of ease of setting in a winding machine or a feeding machine and workability.

The cross-sectional shape of the core is normally circular so as to enable suitable production of a uniform roll-shaped body.

The core of the roll-shaped body is preferably made from a material that does not deform upon winding of a certain amount of the adhesive agent sheet and the protective sheet that are overlapped facing one another. Specific examples include cores formed from polypropylene resin, ABS resin, polyethylene resin, resin-impregnated paper, glass fiber-compounded resin, and the like.

The internal diameter and external diameter of the core are preferably selected as appropriate depending on equipment used in subsequent steps. The use of a core having an external diameter that is normally 10 mm or more, preferably 76 mm or more, and more preferably 150 mm or more can prevent problems such as warping of the adhesive agent sheet of the produced roll-shaped body and enables suitable use in subsequent steps.

Figure 1:
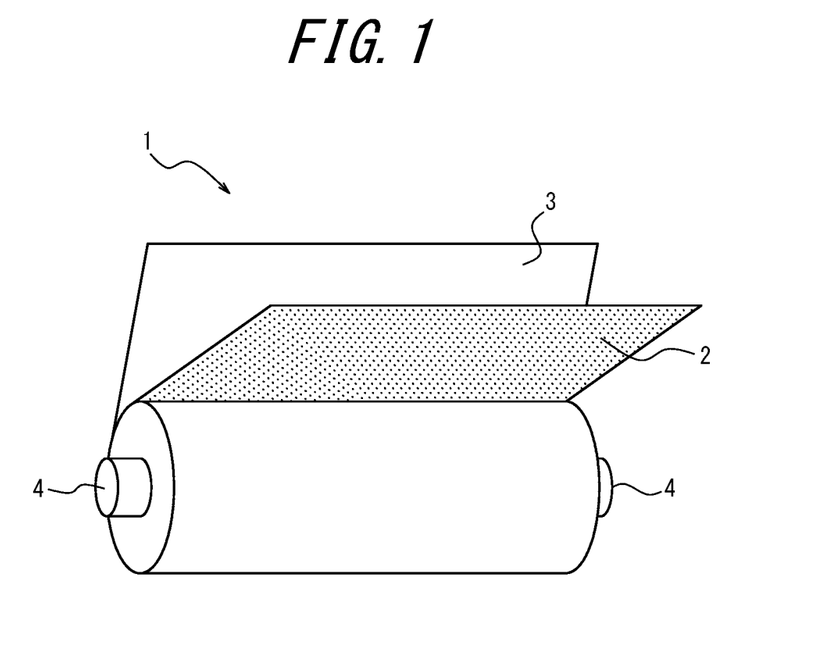
FIG. 1 is a perspective schematic view illustrating a presently disclosed roll-shaped body.

The following describes one example of the presently disclosed roll-shaped body with reference to FIG. 1.

FIG. 1 is a perspective schematic view illustrating the presently disclosed roll-shaped body. In FIG. 1, reference sign "1" indicates the roll-shaped body in a state in which a sheet end part has been partially peeled from the roll, reference sign "2" indicates the adhesive agent sheet having an embossed shape at both surfaces thereof, reference sign "3" indicates the protective sheet having releasability, and reference sign "4" indicates the core.

The length of the core 4 may be longer than the width of the roll-shaped body such that the core 4 protrudes from the roll-shaped body or may be the same as the width of the roll-shaped body such that the core 4 does not protrude from the roll-shaped body.

The presently disclosed roll-shaped body is held with the roll width direction horizontal relative to the ground using an external support such as a side plate for hanging, a side protector, or the like, and in some cases may be housed in a paper container, a plastic container, or the like for transport and storage.

The width of the roll-shaped body (defined as the width of the protective sheet in the present disclosure) may be freely selected depending on the application so long as it is at least the width of the adhesive agent sheet, but is normally selected as appropriate from a range of 1 cm to 300 cm. The diameter of the roll-shaped body can be freely selected depending on the length of the wound up adhesive agent sheet, but is normally selected as appropriate from a range of 10 cm to 100 cm.

Commonly known methods can be adopted without any specific limitations as the method by which the presently disclosed roll-shaped body is produced.

Figure 2:
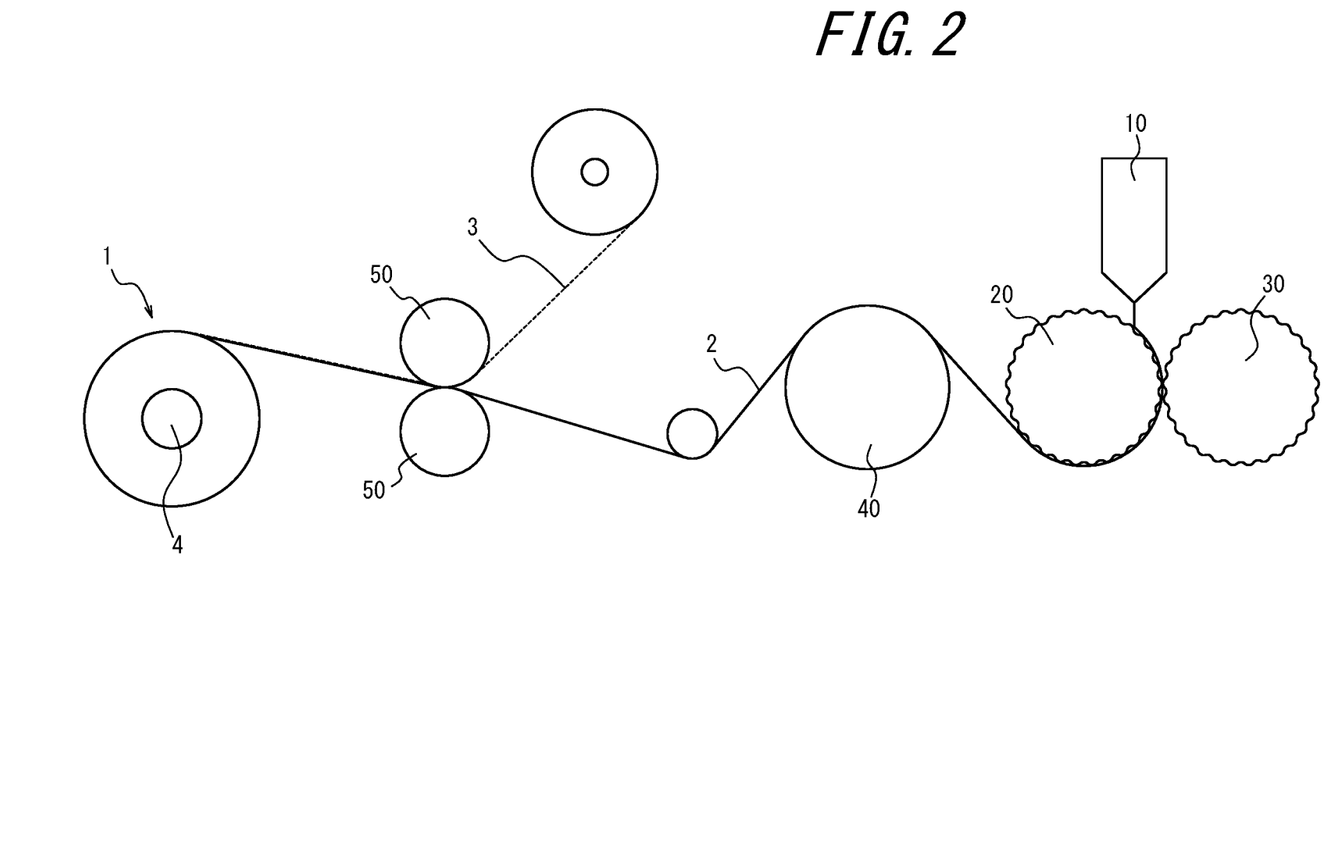
FIG. 2 is a schematic view illustrating a method of producing a presently disclosed roll-shaped body using a T-die film melt extruder.

The following describes one example of a method of producing the presently disclosed roll-shaped body with reference to FIG. 2.

FIG. 2 is a schematic view illustrating a method of producing the presently disclosed roll-shaped body using a T-die film melt extruder. In FIG. 2, reference sign "10" indicates a T-die connected to an extruder or the like, reference sign "20" indicates a casting roll having an embossed shape at the surface thereof, reference sign "30" indicates a nip roll having an embossed shape at the surface thereof, reference sign "40" indicates a cooling roll, reference sign "50" indicates a conveying roll, reference sign "1" indicates a produced roll-shaped body, reference sign "2" indicates a shaped adhesive agent sheet containing a thermoplastic resin as a main component, reference sign "3" indicates a protective sheet having releasability, and reference sign "4" indicates a core that is attached to a winding machine (not illustrated).

One surface of a melt of an adhesive agent containing a thermoplastic resin as a main component that is extruded from the T-die (10) is brought into contact with the surface of the casting roll (20) and the melt is nipped from the opposite surface thereof at the nip roll (30) so as to produce a sheet having an embossed shape at both surfaces thereof.

Note that although nipping is performed after the melt has come into contact with the surface of the casting roll in FIG. 2, the melt may be nipped simultaneously to being brought into contact with the surface of the casting roll.

Winding is performed by the winding machine after the sheet has been passed across a roll (40) for conveying or cooling as necessary.

The protective sheet (3) may be overlapped facing the adhesive agent sheet (2) during any of cooling, conveying, and winding. However, if the protective sheet (3) and the molten resin are overlapped at the same time as nipping by the casting roll (20) and the nip roll (30), it may not be possible to impart the desired embossed shape on the adhesive agent sheet. Therefore, it is preferable that overlapping is performed in a step from cooling through to conveying and winding.

Although no specific limitations are placed on the overlapping method, performing overlapping at a location corresponding to conveying rolls (50), for example, makes it easy to uniformly overlap the adhesive agent sheet (2) and the protective sheet (3), and enables production of a suitable roll-shaped body (1).

The material of the casting roll (20) made from metal is not specifically limited, but a metal roll having high rigidity and a structure in which a temperature-controllable heating or cooling medium can flow internally is preferable.

Although no specific limitations are placed on the size of the casting roll (20), the casting roll (20) is preferably of sufficient size to enable cooling and solidification of a film-like melt formed from the adhesive agent that is melt-extruded from the T-die (10). The diameter of the casting roll (20) is normally approximately 100 mm to 1 m. The roll surface may have been subjected to surface treatment such as hard chrome plating, nickel plating, amorphous chrome plating, or ceramic spray coating.

An embossed shape is formed at the surface of the casting roll (20). No specific limitations are placed on the shape of embossing in terms of depth, height, pitch, regularity, line shape, point shape, or the like so long as the adhesive agent sheet used in the method according to the present disclosure can inhibit sheet blocking and can inhibit sticking in a situation in which the adhesive agent sheet comes into contact with a smooth glass surface or the like.

Any method commonly known in the art may be used as the method by which the embossed shape is formed at the surface of the casting roll (20) so long as the effects disclosed herein are not lost. Specific examples include blasting, mill engraving using a mother mill, laser engraving, and etching.

The surface of the nip roll (30) is preferably formed from a material having lower hardness than the casting roll (20). Specifically, the nip roll (30) is preferably formed from a rubber material having a Shore A hardness of 45 to 70. If the rubber used at the surface is too hard, this may increase heat shrinkage of the produced adhesive agent sheet. Conversely, if the rubber is too soft, the surface of the rubber nip roll may deform during nipping such that it is not possible to impart the desired embossed shape on the surface of the adhesive agent sheet.

The diameter of the nip roll (30) is normally approximately 100 mm to 1 m.

It is preferable that a core material of the nip roll (30) is made from metal and has a structure in which a temperature-controllable heating or cooling medium can flow internally. The thickness of the rubber layer having an embossed shape at the surface is not specifically limited so long as temperature control using the medium is possible.

An embossed shape is formed at the surface of the nip roll (30). The shape of the embossing may be any shape without any specific limitations in terms of depth, height, pitch, regularity, line shape, point shape, or the like so long as the effects disclosed herein are not lost.

Any method commonly known in the art may be used as the method by which the embossed shape is formed at the surface of the nip roll (30) so long as the effects disclosed herein are not lost. Specific examples include blasting, mill engraving using a mother mill, laser engraving, and etching.

The embossed shape at the surfaces of the adhesive agent sheet that is produced using the casting roll (20) and the nip roll (30) that each have an embossed shape may, for example, be a satin shape, a continuous groove shape, a quadrangular pyramid depression shape, a quadrangular pyramid protrusion shape, a combination thereof, or the like such as disclosed in JP H6-198809 A, WO 1995/19885 A1, JP H9-40444 A, JP H9-241045 A, JP H9-295839 A, JP H10-17338 A, JP H10-167773 A, JP H10-231150 A, JP H11-35347 A, JP H11-147735 A, JP 2000-7390 A, JP 2000-44295 A, JP 2000-203902 A, JP 2000-203900 A, JP 2000-203901 A, JP 2000-256043 A, JP 2000-290046 A, JP 2000-319045 A, JP 2001-19499 A, JP 2001-26468 A, JP 2001-48599 A, JP 2001-114538 A, JP 2001-130931 A, JP 2001-150540 A, JP 2001-163641 A, JP 2001-192244 A, JP 2001-261385 A, JP 2001-220182 A, WO 2001/072509 A1, JP 2002-037648 A, JP 2002-104846 A, JP 2003-128442 A, JP 2003-048762 A, JP 2003-212614 A, JP 2003-238218 A, WO 2014/021459 A1, WO 2015/016361 A1, WO 2015/016358 A1, or WO 2015/016366 A1.

In a case in which the used thermoplastic resin is an amorphous resin and the glass-transition temperature (Tg) of the adhesive agent containing the thermoplastic resin as a main component is taken to be $a°$ C., the temperatures of the casting roll and the nip roll during nipping in the production method of the adhesive agent sheet used in the presently disclosed roll-shaped body are preferably adjusted within a range of $(a-100)°$ C. to $a°$ C.

On the other hand, in a case in which the used thermoplastic resin is a crystalline resin and the melting point (Tm) of the adhesive agent containing the thermoplastic resin as a main component is taken to be $b°$ C., the temperatures of the casting roll and the nip roll are preferably adjusted within a range of $(b-100)°$ C. to $(b-30)°$ C. The temperature of the nip roll is preferably not higher than the temperature of the casting roll because the adhesive agent sheet sticks to the nip roll more easily if the temperature of the nip roll is higher than the temperature of the casting roll.

If the temperatures of the casting roll and the nip roll are too low, it may not be possible to impart a suitable embossed shape on the surfaces of the adhesive agent sheet, and heat shrinkage of the produced adhesive agent sheet may increase. Conversely, if the temperature of the casting roll is too high, the adhesive agent sheet may wind around the casting roll without peeling therefrom, and production of the adhesive agent sheet may become difficult.

The force with which the melt of the adhesive agent containing the thermoplastic resin as a main component is nipped by the casting roll and the nip roll during nipping can be adjusted as appropriate in accordance with the transfer state of the embossed shape to the shaped adhesive agent sheet.

The linear speed of the melt of the adhesive agent containing the thermoplastic resin as a main component that is extruded from the T-die (10) is 1 m/min to 100 m/min, preferably 2 m/min to 70 m/min, and more preferably 3 m/min to 50 m/min. Productivity of the adhesive agent sheet may decrease if the linear speed is slower than set forth above, whereas embossed shape transfer may be poor if the linear speed is faster than set forth above.

The linear speed at which the protective sheet (3) having releasability is supplied is preferably the same as the linear speed at which the adhesive agent sheet (2) is supplied. When the linear speed at which the adhesive agent sheet is supplied is taken to be 1, the linear speed ratio is preferably within a range of 0.8 to 1.2.

Creases may form more easily in the adhesive agent sheet in the roll-shaped body if the linear speed at which the protective sheet (3) is supplied is too slow, whereas creases may form more easily in the protective sheet and production of a good roll-shaped body may become difficult if the linear speed at which the protective sheet (3) is supplied is too fast.

The presently disclosed roll-shaped body can prevent blocking of the adhesive agent sheet, even upon temporary storage or transport under a high temperature of 60° C. that is anticipated may occur in transport and storage of the roll-shaped body, because there is no direct adhesive agent sheet on adhesive agent sheet contact in the roll-shaped body.

As a result of the presently disclosed roll-shaped body excelling in terms of prevention of adhesive agent sheet blocking, the presently disclosed roll-shaped body can suitably be used in production of a laminate such as laminate glass without blocking of the adhesive agent sheet occurring even up to a part in proximity to the core.

Evaluation of blocking of the adhesive agent sheet in the presently disclosed roll-shaped body can be carried out by a method described in the EXAMPLES section, for example.

Once the adhesive agent sheet has been taken out from the presently disclosed roll-shaped body and the protective sheet has been removed, the adhesive agent sheet can be used in production of a laminate that is unified through adhesion by overlapping the adhesive agent sheet with a sheet of an inorganic material such as glass or metal, and then performing heating and pressing thereof.

In this situation, a laminate having a greater number of layers can be obtained by using two or more adhesive agent sheets.

The adhesive agent sheet that has been taken from the presently disclosed roll-shaped body and from which the protective sheet has been removed may be used to produce laminate glass, for example, by a process such as described below.

Specifically, glass sheets and adhesive agent sheets can be overlapped to obtain a laminated product in a manner such as glass sheet/adhesive agent sheet/glass sheet, glass sheet/adhesive agent sheet/adhesive agent sheet/glass sheet, glass sheet/adhesive agent sheet/adhesive agent sheet/adhesive agent sheet/glass sheet, or glass sheet/adhesive agent sheet/adhesive agent sheet/adhesive agent sheet/adhesive agent sheet/glass sheet, and these glass sheets and adhesive agent sheets can be adhered together by placing the laminated product in a heat-resistant rubber bag or the like, degassing the inside of the rubber bag, and subsequently performing heating and pressing.

The heating temperature is normally 100° C. to 200° C., preferably 110° C. to 190° C., and more preferably 120° C. to 180° C.

The pressing pressure is normally 0.1 MPa to 10 MPa, preferably 0.2 MPa to 5 MPa, and more preferably 0.3 MPa to 1 MPa.

The time for which heating and pressing are performed is normally 1 minute to 90 minutes, preferably 3 minutes to 60 minutes, and more preferably 5 minutes to 30 minutes.

Good adhesive agent sheet on glass sheet adhesion can be obtained when the temperature, pressure, and time are within any of the ranges set forth above.

The presently disclosed roll-shaped body can preferably be used in applications such as producing an adhesive agent for a thin glass film; a sealing material for a solar cell; a sealing material for a functional electronic element such as a liquid-crystal display element, a dimming element, a thermochromic element, an electrochromic element, a light-emitting diode (LED), or an organic light-emitting diode (OLED); a penetration resistant window material or bullet-proof glass in which a plurality of members such as a glass sheet, an adhesive agent sheet, and a resin sheet are laminated; or the like. In particular, the presently disclosed roll-shaped body is preferably used as a transported and/or stored form of an adhesive agent sheet for which adhesion is required at a low temperature, such as an adhesive agent sheet used in an application of sandwiching and sealing, between glass sheets, a functional electronic element for which a temperature of 90° C. or higher is not permitted during adhesion, for example.

EXAMPLES

The following provides a more detailed description of the present disclosure through examples and a comparative example. However, the present disclosure is not in any way limited by these examples.

Evaluations in the examples were carried out by the following methods.
(1) Weight-Average Molecular Weight (Mw) and Molecular Weight Distribution (Mw/Mn)

The molecular weight of a block copolymer [C] or a hydrogenated block copolymer [D] was measured at 38° C. as a standard polystyrene-equivalent value by gel permeation chromatography (GPC) using tetrahydrofuran (THF) as an eluent. The measurement apparatus was an HLC8020GPC produced by Tosoh Corporation.
(2) Percentage Hydrogenation The percentage hydrogenation of main chains and side chains and of aromatic rings in a hydrogenated block copolymer [D] was calculated by measuring a $^1$H-NMR spectrum.

(3) Glass-Transition Temperature ($Tg_2$)

Prepared pellets were piled up and were pressed at 150° C. to perform thermocompression bonding and prepare a sheet of approximately 1 mm in thickness. A specimen of 50 mm in length and 10 mm in width was cut out from the obtained sheet. This specimen was used to measure a dynamic viscoelasticity characteristic in accordance with JIS K7244-2 using a viscoelasticity measurement apparatus (produced by TA Instruments; product name: ARES) with a frequency of 1 Hz, a temperature range of −100° C. to +150° C., and a heating rate of 5° C./min. A higher-temperature peak top temperature of the loss tangent tan δ was taken to be the higher glass-transition temperature (hereinafter, "$Tg_2$").
(4) Evaluation of Blocking An adhesive agent sheet [K] was overlapped facing a protective sheet [X] having releasability and 100 m thereof was wound around a core made of polypropylene resin (PP) and having an internal diameter of 3 inches with the protective sheet [X] positioned at the outside thereof to obtain a roll-shaped body [R]. The obtained roll-shaped body [R] was stored in a 60° C. environment for 200 hours and for 2 months. Thereafter, the adhesive agent sheet was fed using a sheet feeding machine. Blocking resistance was evaluated as "good" in a case in which the adhesive agent sheet could be fed up to the core without problems, and blocking resistance was evaluated as "poor" in a case in which the sheet became stuck and could not be fed part way through feeding or in a case in which there was significant resistance to feeding of the adhesive agent sheet and in which the sheet was deformed by stretching or the like.

[Production Example 1] Production of Pellets of Modified Hydrogenated Block Copolymer [E1]

(Production of Hydrogenated Block Copolymer [D1])

A reactor that was equipped with a stirrer and had been sufficiently internally purged with nitrogen was charged with 300 parts of dehydrated cyclohexane, 10 parts of dehydrated styrene, and 1.1 parts of dibutyl ether. Polymerization was initiated by adding 0.75 parts of n-butyllithium (15% cyclohexane solution) while stirring the contents of the reactor at 60° C. The contents of the reactor were further stirred at 60° C. while 15 parts of dehydrated styrene was added continuously into the reactor over 40 minutes and while the polymerization reaction proceeded, and were also stirred for a further 20 minutes at 60° C. after this addition had ended. The polymerization conversion rate at this point as determined by gas chromatography (GC) measurement of the reaction liquid was 99.5%.

Next, 50 parts of dehydrated isoprene was added continuously to the reaction liquid over 130 minutes and stirring was continued for a further 30 minutes after this addition had ended. The polymerization conversion rate at this point as determined by GC analysis of the reaction liquid was 99.5%.

Thereafter, a further 25 parts of dehydrated styrene was added continuously to the reaction liquid over 70 minutes and stirring was continued for a further 60 minutes after this addition had ended. The polymerization conversion rate at this point as determined by GC analysis of the reaction liquid was almost 100%.

The reaction was terminated by adding 1.0 parts of isopropyl alcohol to the reaction liquid to yield a polymer solution. The polymer solution contained a block copolymer [C1] that was an [A]-[B]-[A] triblock copolymer having a weight-average molecular weight (Mw) of 56,700, a molecular weight distribution (Mw/Mn) of 1.03, and a wA:wB ratio of 50:50.

Next, the polymer solution was transferred to a pressure-resistant reactor equipped with a stirrer, and 4.0 parts of nickel catalyst supported on diatomaceous earth carrier (product name: E22U; supported amount of nickel: 60%; produced by JGC Catalysts and Chemicals Ltd.) as a hydrogenation catalyst and 100 parts of dehydrated cyclohexane were added and mixed therewith. The inside of the reactor was purged with hydrogen gas and hydrogen gas was also supplied while stirring the solution to carry out a hydrogenation reaction for 6 hours at a temperature of 190° C. and a pressure of 4.5 MPa.

The reaction solution obtained through the hydrogenation reaction contained a hydrogenated block copolymer [D1] having a weight-average molecular weight (Mw) of 60,100 and a molecular weight distribution (Mw/Mn) of 1.04.

Once the hydrogenation reaction had ended, the reaction solution was filtered to remove the hydrogenation catalyst. Thereafter, 2.0 parts of a xylene solution in which 0.1 parts of pentaerythritol tetrakis[3-(3,5-di-t-butyl-4-hydroxyphenyl)propionate] (phenolic antioxidant; product name: AO60; produced by ADEKA Corporation) had been dissolved was added to the reaction solution and dissolved.

Next, a cylindrical evaporator (product name: Kontro; produced by Hitachi, Ltd.) was used to remove cyclohexane, xylene, and other volatile components from the solution at a temperature of 260° C. and a pressure of 0.001 MPa. Molten polymer was extruded as strands from a die and was cut by a pelletizer after cooling to obtain 94 parts of pellets formed from the hydrogenated block copolymer [D1].

The resultant pelletized hydrogenated block copolymer [D1] had a weight-average molecular weight (Mw) of 59,500, a molecular weight distribution (Mw/Mn) of 1.06, a percentage hydrogenation of almost 100%, and a $Tg_2$ of 131° C.

(Production of Modified Hydrogenated Block Copolymer [E1])

A mixture was obtained by adding 2.0 parts of vinyltrimethoxysilane and 0.2 parts of 2,5-dimethyl-2,5-di(t-butylperoxy)hexane (product name: PERHEXA® 25B (PERHEXA is a registered trademark in Japan, other countries, or both); produced by NOF Corporation) to 100 parts of the obtained pellets of the hydrogenated block copolymer [D1]. The mixture was kneaded with a resin temperature of 200° C. and a residence time of 60 s to 70 s using a twin-screw extruder (product name: TEM37B; produced by Toshiba Machine Co., Ltd.). The resultant kneaded product was extruded as strands and was cut by a pelletizer after air cooling to obtain 97 parts of pellets [P1] of a modified hydrogenated block copolymer [E1] including alkoxysilyl groups.

A solution was obtained by dissolving 10 parts of the pellets [P1] in 100 parts of cyclohexane and was then poured into 400 parts of dehydrated methanol to coagulate the modified hydrogenated block copolymer [E1]. The coagulated material was collected by filtration. The filtration residue was vacuum dried at 25° C. to isolate 9.0 parts of crumb of the modified hydrogenated block copolymer [E1].

When an FT-IR spectrum of the modified hydrogenated block copolymer [E1] was measured, new absorption bands attributed to Si—$OCH_3$ groups (1090 $cm^{-1}$) and Si—$CH_2$ groups (825 $cm^{-1}$ and 739 $cm^{-1}$) were observed at positions differing from absorption bands attributed to the Si—$OCH_3$ groups and the Si—$CH_2$ group of vinyltrimethoxysilane (1075 $cm^{-1}$, 808 $cm^{-1}$, and 766 $cm^{-1}$).

Moreover, when a $^1$H-NMR spectrum (in deuterated chloroform) of the modified hydrogenated block copolymer [E1] was measured, a peak based on methoxy group protons was observed at 3.6 ppm. It was confirmed from the peak area ratio that 1.9 parts of vinyltrimethoxysilane was bonded per 100 parts of the hydrogenated block copolymer [D1]. $Tg_2$ of the modified hydrogenated block copolymer [E1] was 126° C.

[Production Example 2] Production of Pellets of Modified Hydrogenated Block Copolymer [E2]

Pellets of a hydrogenated block copolymer [D2] were obtained by carrying out polymerization, hydrogenation, concentration/drying, extrusion, cooling, and pelletizing in the same way as in Production Example 1 with the exception that 20 parts of styrene, 60 parts of isoprene, and 20 parts of styrene were added in this order, and the amount of n-butyllithium (15% cyclohexane solution) was changed to 0.69 parts.

Introduction of alkoxysilyl groups to the hydrogenated block copolymer [D2] was carried out in the same way as in Production Example 1 to obtain 97 parts of pellets [P2] formed from a modified hydrogenated block copolymer [E2].

The pre-hydrogenation block copolymer [C2] was an [A]-[B]-[A] triblock copolymer having a wA:wB ratio of 40:60.

The obtained hydrogenated block copolymer [D2] had a weight-average molecular weight (Mw) of 61,000, a molecular weight distribution (Mw/Mn) of 1.06, and a percentage hydrogenation of almost 100%.

[Production Example 3] Production of Pellets of Modified Hydrogenated Block Copolymer [E3]

A mixture was obtained by adding 2.0 parts of maleic anhydride and 0.2 parts of 2,5-dimethyl-2,5-di(t-butylperoxy)hexane (product name: PERHEXA® 25B; produced by NOF Corporation) per 100 parts of the hydrogenated block copolymer [D1] produced in Production Example 1. The mixture was kneaded with a resin temperature of 200° C. and a residence time of 60 s to 70 s using a twin-screw extruder, was extruded as strands, and was cut by a pelletizer after air cooling to obtain 96 parts of pellets [P3] formed from a modified hydrogenated block copolymer [E3] including acid anhydride groups.

A solution was obtained by dissolving 10 parts of the pellets [P3] in 100 parts of cyclohexane and was then poured into 400 parts of dehydrated acetone to coagulate the modified hydrogenated block copolymer [E3]. The coagulated material was separated and was vacuum dried at 25° C. to isolate 9.0 parts of crumb of the modified hydrogenated block copolymer [E3].

When an FT-IR spectrum of the modified hydrogenated block copolymer [E3] was measured, a new absorption band attributed to —C(=O)—O—C(=O)— groups was observed at 1790 $cm^{-1}$. A calibration curve that had been prepared in advance was used to confirm from a ratio of the light absorbance of this absorption band and the light absorbance at 2920 $cm^{-1}$ attributed to C—H bonds that 1.8 parts of maleic anhydride was bonded per 100 parts of the hydrogenated block copolymer [D1].

[Production Example 4] Production of Pellets Containing Modified Hydrogenated Block Copolymer [E1]

A twin-screw extruder equipped with a side feeder by which a liquid material could be added was used to continuously extrude the pellets [P1] of the hydrogenated block copolymer [E1] including alkoxysilyl groups that were produced in Production Example 1 with a resin temperature of 210° C. while hydrogenated polyisobutene (product name: NOF Polybutene® (NOF Polybutene is a registered trademark in Japan, other countries, or both) 10SH; produced by NOF Corporation) was continuously added from the side feeder as a tackifier in a ratio of 15.0 parts per 100 parts of the pellets [P1]. Kneading, extrusion as strands, air cooling, and subsequent cutting by a pelletizer were performed to obtain 97 parts of pellets [P4].

$Tg_2$ of the pellets [P4] was 110° C.

[Production Example 5] Production of Pellets of Modified Hydrogenated Block Copolymer [E5]

Pellets of a hydrogenated block copolymer [D3] were obtained by carrying out polymerization, hydrogenation, concentration/drying, extrusion, cooling, and pelletizing in the same way as in Production Example 1 with the exception that the amount of n-butyllithium (15% cyclohexane solution) was changed to 0.88 parts.

Introduction of alkoxysilyl groups to the hydrogenated block copolymer [D3] was carried out in the same way as in Production Example 1 to obtain 98 parts of pellets [P5] formed from a modified hydrogenated block copolymer [E5]. It was confirmed from a peak area ratio in the same way as in Production Example 1 that 1.8 parts of vinyltrimethoxysilane was bonded per 100 parts of the hydrogenated block copolymer [D3].

The pre-hydrogenation block copolymer [C3] was an [A]-[B]-[A] triblock copolymer having a wA:wB ratio of 50:50.

The obtained hydrogenated block copolymer [D3] had a weight-average molecular weight (Mw) of 49,500, a molecular weight distribution (Mw/Mn) of 1.03, a percentage hydrogenation of almost 100%, and a $Tg_2$ of 126° C.

$Tg_2$ of the modified hydrogenated block copolymer [E5] was 121° C.

[Production Example 6] Production of Pellets Containing Modified Hydrogenated Block Copolymer [E5]

A twin-screw extruder equipped with a side feeder by which a liquid material could be added was used to continuously extrude the pellets [P5] of the hydrogenated block copolymer [E5] including alkoxysilyl groups that were produced in Production Example 5 with a resin temperature of 210° C. while hydrogenated polyisobutene (product name: NOF Polybutene® 10SH; produced by NOF Corporation) was continuously added from the side feeder as a tackifier in a ratio of 17.5 parts per 100 parts of the pellets [P5]. Kneading, extrusion as strands, air cooling, and subsequent cutting by a pelletizer were performed to obtain 97 parts of pellets [P6].

$Tg_2$ of the pellets [P6] was 105° C.

Example 1

An adhesive agent sheet [K1] of 0.8 mm in thickness was produced using the pellets [P1] obtained in Production Example 1 by using a T-die (produced by GSI Creos Corporation) of 600 mm in width and a T-die type film melt extruder (model: GT40; produced by Research Laboratory of Plastics Technology Co., Ltd.) including an extruder equipped with a full-flight screw of 40 mm in diameter to extrude a melt of the pellets [P1] from the T-die with a cylinder temperature of 190° C. and a T-die temperature of 190° C., performing nipping of the extruded melt using a metal casting roll (set temperature: 80° C.) having a satin-like embossed shape at the surface thereof and a nip roll (set temperature: 80° C.) made from rubber having a hardness of 60 and having a similar satin-like embossed shape to the casting roll at the surface thereof, and subsequently cooling the melt of the pellets [P1] using a cooling roll (temperature: 60° C.).

The thickness of the adhesive agent sheet [K1] was measured using a contact-type thickness meter (Digimatic Indicator Code No. 543-575; produced by Mitutoyo Corporation).

A satin-like embossed shape had been transferred onto both surfaces of the obtained adhesive agent sheet [K1].

Both edges of the adhesive agent sheet [K1] were cut off to adjust the width to 460 mm. The adhesive agent sheet [K1] and a polypropylene protective sheet [X1] of 40 μm in thickness were subsequently overlapped facing one another, and 100 m thereof was wound up around a polypropylene resin core having an internal diameter of 3 inches to produce a roll-shaped body [R1].

(Evaluation of Roll-Shaped Body [R1])

When the roll-shaped body [R1] was set in a feeding machine after being stored at 60° C. for 200 hours and for 2 months, it was possible to perform feeding up to the core without problems. Moreover, when peeling of the protective sheet [X1] and the adhesive agent sheet [K1] was inspected, there was good peeling along the entire length thereof and deformation of the adhesive agent sheet [K1] did not occur.

Example 2

An adhesive agent sheet [K2] of 0.8 mm in thickness was produced under the same conditions as in Production Example 1 with the exception that the pellets [P2] obtained in Production Example 2 were used instead of the pellets [P1] obtained in Production Example 1. The adhesive agent sheet [K2] had an embossed shape at both surfaces thereof. Both edges of the adhesive agent sheet [K2] were cut off to adjust the width to 460 mm. The adhesive agent sheet [K2] and a polyethylene terephthalate protective sheet [X2] of 25 μm in thickness were subsequently overlapped facing one another, and 100 m thereof was wound up around a polypropylene resin core having an internal diameter of 3 inches to produce a roll-shaped body [R2].

(Evaluation of Roll-Shaped Body [R2])

When the roll-shaped body [R2] was set in a feeding machine after being stored at 60° C. for 200 hours and for 2 months, it was possible to perform feeding up to the core without problems. Moreover, when peeling of the protective sheet [X2] and the adhesive agent sheet [K2] was inspected, there was good peeling along the entire length thereof and deformation of the adhesive agent sheet [K2] did not occur.

Example 3

An adhesive agent sheet [K3] of 0.8 mm in thickness was obtained under the same conditions as in Example 1 with the exception that the pellets [P3] obtained in Production Example 3 were used instead of the pellets [P1] obtained in Production Example 1, the temperatures of the extruder cylinder and T-die were changed to 160° C., and the temperatures of the casting roll and nip roll were changed to 60° C. The adhesive agent sheet [K3] had an embossed shape at both surfaces thereof. Both edges of the adhesive agent sheet

[K3] were cut off to adjust the width to 460 mm. The adhesive agent sheet [K3] and a protective sheet [X1] were subsequently overlapped facing one another, and 100 m thereof was wound up around a 3-inch PP core to produce a roll-shaped body [R3].
(Evaluation of Roll-Shaped Body [R3])

When the roll-shaped body [R3] was set in a feeding machine after being stored at 60° C. for 200 hours and for 2 months, it was possible to perform feeding up to the core without problems. Moreover, when peeling of the protective sheet [X1] and the adhesive agent sheet [K3] was inspected, there was good peeling along the entire length thereof and deformation of the adhesive agent sheet [K3] did not occur.

Example 4

An adhesive agent sheet [K4] of 0.8 mm in thickness was produced under the same conditions as in Example 1 with the exception that the pellets [P5] obtained in Production Example 5 were used instead of the pellets [P1] obtained in Production Example 1, the temperatures of the extruder cylinder and T-die were changed to 170° C., and the temperatures of the casting roll and nip roll were changed to 60° C. The adhesive agent sheet [K4] had an embossed shape at both surfaces thereof. Both edges of the adhesive agent sheet [K4] were cut off to adjust the width to 460 mm. The adhesive agent sheet [K4] and a polyethylene terephthalate protective sheet [X2] of 25 μm in thickness were subsequently overlapped facing one another, and 100 m thereof was wound up around a polypropylene resin core having an internal diameter of 3 inches to produce a roll-shaped body [R5].
(Evaluation of Roll-Shaped Body [R5])

When the roll-shaped body [R5] was set in a feeding machine after being stored at 60° C. for 200 hours and for 2 months, it was possible to perform feeding up to the core without problems. Moreover, when peeling of the protective sheet [X2] and the adhesive agent sheet [K4] was inspected, there was good peeling along the entire length thereof and deformation of the adhesive agent sheet [K4] did not occur.

Example 5

An adhesive agent sheet [K5] of 0.8 mm in thickness was produced under the same conditions as in Example 1 with the exception that the pellets [P4] obtained in Production Example 4 were used instead of the pellets [P1] obtained in Production Example 1, the temperatures of the extruder cylinder and T-die were changed to 200° C., and the temperatures of the casting roll and nip roll were changed to 60° C. The adhesive agent sheet [K5] had an embossed shape at both surfaces thereof. Both edges of the adhesive agent sheet [K5] were cut off to adjust the width to 460 mm. The adhesive agent sheet [K5] and a polyethylene terephthalate protective sheet [X2] of 25 μm in thickness were subsequently overlapped facing one another, and 100 m thereof was wound up around a polypropylene resin core having an internal diameter of 3 inches to produce a roll-shaped body [R6].
(Evaluation of Roll-Shaped Body [R6])

When the roll-shaped body [R6] was set in a feeding machine after being stored at 60° C. for 200 hours and for 2 months, it was possible to perform feeding up to the core without problems. Moreover, when peeling of the protective sheet [X2] and the adhesive agent sheet [K5] was inspected, there was good peeling along the entire length thereof and deformation of the adhesive agent sheet [K5] did not occur.

Example 6

An adhesive agent sheet [K6] of 0.8 mm in thickness was produced under the same conditions as in Example 1 with the exception that the pellets [P6] obtained in Production Example 6 were used instead of the pellets [P1] obtained in Production Example 1, the temperatures of the extruder cylinder and T-die were changed to 150° C., and the temperatures of the casting roll and nip roll were changed to 40° C. The adhesive agent sheet [K6] had an embossed shape at both surfaces thereof. Both edges of the adhesive agent sheet [K6] were cut off to adjust the width to 460 mm. The adhesive agent sheet [K6] and a polypropylene protective sheet [X1] of 40 μm in thickness were subsequently overlapped facing one another, and 100 m thereof was wound up around a polypropylene resin core having an internal diameter of 3 inches to produce a roll-shaped body [R7].
(Evaluation of Roll-Shaped Body [R7])

When the roll-shaped body [R7] was set in a feeding machine after being stored at 60° C. for 200 hours and for 2 months, it was possible to perform feeding up to the core without problems. Moreover, when peeling of the protective sheet [X1] and the adhesive agent sheet [K6] was inspected, there was good peeling along the entire length thereof and deformation of the adhesive agent sheet [K6] did not occur.

Comparative Example 1

A roll-shaped body [R4] was produced under the same conditions as in Example 3 with the exception that the protective sheet [X1] was not used in production of the roll-shaped body [R].
(Evaluation of Roll-shaped Body [R4])

When the roll-shaped body [R4] was set in a feeding machine after being stored at 60° C. for 200 hours and for 2 months, there was resistance during feeding and deformation of the adhesive agent sheet [K3] was observed by eye.

The following conclusions can be drawn from the examples and comparative example.

In the case of a roll-shaped body in which an adhesive agent sheet containing a thermoplastic resin as a main component and having an embossed shape at both surfaces thereof is wound up with a protective sheet having releasability, blocking is not observed and peeling of the adhesive agent sheet and the protective sheet is good even after the roll-shaped body is stored at 60° C. for 200 hours and for 2 months.

On the other hand, significant adhesive agent sheet blocking occurs after storage at 60° C. for 200 hours and for 2 months in the case of a roll-shaped body that is produced without using a protective sheet (Comparative Example 1).

INDUSTRIAL APPLICABILITY

The presently disclosed roll-shaped body including an adhesive agent sheet containing a thermoplastic resin as a main component and having an embossed shape at both surfaces thereof has excellent blocking prevention in high-temperature environments.

Moreover, when the adhesive agent sheet of the presently disclosed roll-shaped body is used in production of a laminate, the adhesive agent sheet can be used up to the roll core without blocking, which provides excellent productivity and economy.

REFERENCE SIGNS LIST 1 roll-shaped body
2 adhesive agent sheet
3 protective sheet
4 core
10 T-die
20 casting roll
30 nip roll
40 cooling roll
50 conveying roll

The invention claimed is:

1. A method of producing a roll-shaped body comprising:
obtaining an adhesive agent sheet having an embossed shape at both surfaces thereof by contacting a melt of an adhesive agent containing a thermoplastic resin as a main component with a surface of a casting roll having an embossed shape at the surface thereof and, after the melt has come into contact with the surface of the casting roll, nipping the melt with the casting roll and a nip roll having an embossed shape at the surface thereof,
overlapping a protective sheet having releasability from the adhesive agent sheet to at least one surface of the adhesive agent sheet having the embossed shape at both surfaces thereof, and
obtaining the roll-shaped body by wounding the adhesive agent sheet having the embossed shape at both surfaces thereof and the protective sheet that are overlapped facing one another.

2. The method of producing a roll-shaped body according to claim 1, wherein the thermoplastic resin is a modified hydrogenated block copolymer [E] obtained through introduction of either or both of an alkoxysilyl group and an acid anhydride group into a hydrogenated block copolymer [D] obtained through hydrogenation of a block copolymer [C] including at least two polymer blocks [A] having a repeating unit derived from an aromatic vinyl compound as a main repeating unit and at least one polymer block [B] having a repeating unit derived from a chain conjugated diene compound as a main repeating unit.

3. The method of producing a roll-shaped body according to claim 1, wherein the thermoplastic resin is a modified hydrogenated block copolymer [E] obtained through introduction of either or both of an alkoxysilyl group and an acid anhydride group into a hydrogenated block copolymer [D] obtained through hydrogenation of 90% or more of main chain and side chain carbon-carbon unsaturated bonds and aromatic ring carbon-carbon unsaturated bonds in a block copolymer [C] including at least two polymer blocks [A] having a repeating unit derived from an aromatic vinyl compound as a main repeating unit and at least one polymer block [B] having a repeating unit derived from a chain conjugated diene compound as a main repeating unit.

4. The method of producing a roll-shaped body according to claim 1, wherein the adhesive agent sheet further contains at least 1 part by mass and not more than 40 parts by mass of a tackifier per 100 parts by mass of the thermoplastic resin.

5. The method of producing a roll-shaped body according to claim 1, wherein the protective sheet is formed from a resin having at least one of polyethylene, polypropylene, and polyethylene terephthalate as a main component.

6. The method of producing a roll-shaped body according to claim 1, wherein the melt is extruded from the T-die to the surface of a casting roll.

7. The method of producing a roll-shaped body according to claim 1, wherein the surface of the nip roll is formed from a material having lower hardness than the casting roll.

8. The method of producing a roll-shaped body according to claim 1, wherein the nip roll is formed from a rubber material having a Shore A hardness of 45 to 70 and the casting roll is made from metal.

* * * * *